(12) United States Patent
Akaba et al.

(10) Patent No.: US 7,828,104 B2
(45) Date of Patent: Nov. 9, 2010

(54) TRAVEL SAFETY DEVICE FOR MOTOR VEHICLE

(75) Inventors: Hiroshi Akaba, Kawachi-gun (JP);
Koichi Kamiji, Haga-gun (JP);
Yoshihisa Sugamata, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 532 days.

(21) Appl. No.: 10/542,934

(22) PCT Filed: Jan. 16, 2004

(86) PCT No.: PCT/JP2004/000295

§ 371 (c)(1),
(2), (4) Date: Jul. 21, 2005

(87) PCT Pub. No.: WO2004/069615

PCT Pub. Date: Aug. 19, 2004

(65) Prior Publication Data

US 2006/0097504 A1 May 11, 2006

(30) Foreign Application Priority Data

Jan. 24, 2003 (JP) .............................. 2003-016312
Jul. 7, 2003 (JP) .............................. 2003-192935

(51) Int. Cl.
*B60T 8/92* (2006.01)
*B60K 28/10* (2006.01)
(52) U.S. Cl. ........................... 180/268; 303/193; 701/70
(58) Field of Classification Search .................... 701/45, 701/70, 301; 180/167, 268, 271, 274; 303/193; 280/806, 807
See application file for complete search history.

(56) References Cited

U.S. PATENT DOCUMENTS 5,552,986 A    9/1996   Omura et al.

(Continued)

FOREIGN PATENT DOCUMENTS

EP    1 593 591 A1    11/2005

(Continued)

OTHER PUBLICATIONS

Machine english translation of JP 2002-200950 A, which was cited by applicant.*

*Primary Examiner*—Paul N. Dickson
*Assistant Examiner*—Timothy Wilhelm
(74) *Attorney, Agent, or Firm*—Rankin, Hill & Clark LLP (57) ABSTRACT

A travel safety device for a vehicle comprises: an object detecting unit (114) for detecting an object existing in the traveling direction of the vehicle (100); a correlation calculating unit (39) for calculating a correlation involving the distance between the vehicle (100) and the object on the basis of a detection result of the corresponding object detecting unit (114); an automatic brake unit (120) for automatically decelerating the vehicle (100); a safety device (122) including a seatbelt device (15) for automatically tightening the seatbelt (14) and releasing the tightening thereof; and safety device operation control units (38, 39, 43) for determining a possibility of a contact between the vehicle (100) and the object on the basis of the correlation calculated by the correlation calculating unit (39) and for controlling the operation of the safety device (122) where it is predicted that there is a possibility of a contact; wherein the safety device operation control units (38, 39, 43) simultaneously actuate the automatic brake unit (120) and seatbelt device (15) where it is predicted that there is a possibility of a contact.

3 Claims, 7 Drawing Sheets

U.S. PATENT DOCUMENTS

| | | | |
|---|---|---|---|
| 5,585,798 | A | 12/1996 | Yoshioka et al. |
| 5,765,774 | A | 6/1998 | Maekawa et al. |
| 5,788,281 | A | 8/1998 | Yanagi et al. |
| 6,061,015 | A | 5/2000 | Sugimoto |
| 6,278,360 | B1 | 8/2001 | Yanagi |
| 6,293,361 | B1 | 9/2001 | Mueller |
| 6,332,629 | B1 * | 12/2001 | Midorikawa et al. ........ 280/806 |
| 6,356,206 | B1 | 3/2002 | Takenaga et al. |
| 6,363,722 | B1 | 4/2002 | Takehara et al. |
| 6,394,495 | B1 | 5/2002 | Specht |
| 6,463,372 | B1 | 10/2002 | Yokota et al. |
| 6,496,770 | B2 | 12/2002 | Winner et al. |
| 6,574,538 | B2 | 6/2003 | Sasaki |
| 6,701,849 | B2 * | 3/2004 | McFarland et al. .......... 102/530 |
| 6,726,249 | B2 * | 4/2004 | Yano et al. .................. 280/805 |
| 7,059,444 | B2 * | 6/2006 | Kachu ........................ 180/268 |
| 2001/0029418 | A1 * | 10/2001 | Minowa et al. ............... 701/70 |
| 2002/0024211 | A1 | 2/2002 | Yano et al. |
| 2005/0011983 | A1 * | 1/2005 | Inuzuka et al. ............ 242/390.9 |

FOREIGN PATENT DOCUMENTS

| | | |
|---|---|---|
| GB | 2373220 A * | 9/2002 |
| JP | 54-033444 | 3/1979 |
| JP | 54-40432 | 3/1979 |
| JP | 02-246838 | 10/1990 |
| JP | 02-254597 | 10/1990 |
| JP | 05-069785 | 3/1993 |
| JP | 06-107118 | 4/1994 |
| JP | 6-119599 | 4/1994 |
| JP | 6-71333 | 10/1994 |
| JP | 06-286581 | 10/1994 |
| JP | 7-17347 | 1/1995 |
| JP | 7-69188 | 3/1995 |
| JP | 07-081520 | 3/1995 |
| JP | 9-132113 | 5/1997 |
| JP | 9-175327 | 7/1997 |
| JP | 9-272401 | 10/1997 |
| JP | 10-297429 | 11/1998 |
| JP | 10-338111 | 12/1998 |
| JP | 11-112968 | 4/1999 |
| JP | 11-198760 | 7/1999 |
| JP | 11-202049 | 7/1999 |
| JP | 11-286264 | 10/1999 |
| JP | 11-348730 | 12/1999 |
| JP | 2000-006759 | 1/2000 |
| JP | 2000-038110 | 2/2000 |
| JP | 2000-095064 | 4/2000 |
| JP | 2000-108866 | 4/2000 |
| JP | 2000-127896 | 5/2000 |
| JP | 2000-142321 | 5/2000 |
| JP | 2000-172997 | 6/2000 |
| JP | 2000-182027 | 6/2000 |
| JP | 2000-225921 | 8/2000 |
| JP | 2001-010447 | 1/2001 |
| JP | 2001-14596 | 1/2001 |
| JP | 2001-039268 | 2/2001 |
| JP | 2001-58552 | 3/2001 |
| JP | 2001-114069 | 4/2001 |
| JP | 2001-163185 | 6/2001 |
| JP | 2001-247008 | 9/2001 |
| JP | 2001-253317 | 9/2001 |
| JP | 2001-334912 | 12/2001 |
| JP | 2001-341549 | 12/2001 |
| JP | 2001-347923 | 12/2001 |
| JP | 2002-42288 | 2/2002 |
| JP | 2002-120693 | 4/2002 |
| JP | 2002-127871 | 5/2002 |
| JP | 2002-156233 | 5/2002 |
| JP | 2002-200950 | 7/2002 |
| JP | 2002-302026 | 10/2002 |
| JP | 2004-149042 | 5/2004 |
| WO | 02/055349 | 7/2002 |

* cited by examiner

TRAVEL SAFETY DEVICE FOR MOTOR VEHICLE

TECHNICAL FIELD

The present invention relates to a travel safety device for a vehicle, which improves safety in driving.

BACKGROUND ART

As art pertaining to a travel safety device for a vehicle, which improves safety in driving, technology is provided (for example, refer to Japanese Patent Publication No. 2946995), in which a seatbelt device capable of tightening a seatbelt by means of an electric motor is employed, and an occupant is restrained in the seat by forcibly tightening the seatbelt by means of the electric motor when it is predicted that a contact between vehicles will occur.

The travel safety device for a vehicle which is disclosed in the above-described patent document tightens a seatbelt by way of a seatbelt device when it is predicted that a contact between vehicles will occur. Since this strictly aims at restraining an occupant in a seat when a contact occurs, the device operates at the moment when the possibility of a contact between vehicles is increased to a certain degree. Under such condition, occupants usually do not recognize that seatbelt is automatically tightened because the travel safety device just tightens the seatbelt.

Herein, it is highly desirable that an alarm to warn that there is a possibility of a contact between vehicles be outputted to an occupant at an earlier stage than automatic tightening of a seatbelt to restrain the occupant. However, the travel safety device described in the above-described patent document is not provided with a function of intentionally issuing an alarm to the occupant.

DISCLOSURE OF INVENTION

Therefore, it is an object of the present invention to provide a travel safety device for a vehicle and a seatbelt device, which are capable of suitably issuing an alarm to an occupant.

In order to achieve the above-described object, the present invention is a travel safety device for a vehicle which includes an object detecting unit for detecting an object existing in the traveling direction of the vehicle, a correlation calculating unit for calculating a correlation involving the distance between the vehicle and the object on the basis of a detection result of the corresponding object detecting unit, an automatic brake unit for automatically decelerating the vehicle, a safety unit including a seatbelt device for automatically tightening the seatbelt and releasing the tightening thereof, and a safety device operation control unit for determining a possibility of a contact between the vehicle and the object on the basis of the correlation calculated by the corresponding correlation calculating unit and for controlling the operation of the safety device when it is predicted that there is a possibility of a contact, wherein the safety device operation control unit simultaneously actuates the automatic brake unit and the seatbelt device where it is predicted that there is a possibility of a contact.

Therefore, if the correlation calculating unit calculates a correlation involving the distance between the vehicle and an object existing in its traveling direction on the basis of a detection result of the object detecting unit, in accordance therewith, the safety device operation control unit determines whether or not there is a possibility of a contact between the vehicle and the object. If there is a possibility of a contact, the safety device operation control unit simultaneously actuates the automatic brake unit and the seatbelt device and issues an alarm to an occupant. The occupants are caused to recognize that there is a possibility of a contact between the vehicle and an object. Even though when the operation of the automatic brake unit is set out a level at which an occupant is caused to adequately recognize the possibility of a contact, the occupant is caused to clearly recognize the possibility due to actuation of the seatbelt device, and it is possible for the occupant to clearly recognize that the automatic brake unit is operating for prevention of the contact. Therefore, it is possible to urge the occupant to carry out a contact avoiding operation by suitably issuing an alarm to the occupant.

In the above-described travel safety device for a vehicle, the automatic brake unit may be constructed so as to be capable of decelerating the vehicle in a plurality of different deceleration patterns. The seatbelt device may also be constructed so as to be capable of tightening the seatbelt and releasing the tightening thereof in a plurality of different operation patterns.

Thus, since it is possible for the automatic brake unit to carry out deceleration in a plurality of different deceleration patterns and possible for the seatbelt device to carry out tightening of the seatbelt and releasing the tightening thereof in a plurality of different operation patterns, the deceleration and seatbelt actuation may be made different when an alarm is issued to the occupant and when contact with an object is prevented from occurring, and the deceleration and tightening of the seatbelt may be made different in accordance with the degree of emergency.

In the above-described travel safety device for a vehicle, the safety device operation control unit may be constructed so that, when the distance between the vehicle and an object enters a predetermined range on the basis of the correlation calculated by the correlation calculating unit, the automatic brake unit causes deceleration of a degree, which is capable of making the occupant recognize that a braking force has been generated, to be generated, and at the same time, the seatbelt device alternates tightening of the seatbelt and releasing thereof.

Accordingly, as the distance between the vehicle and an object enters a predetermined range, the safety device operation control unit makes the automatic brake unit generate a degree of deceleration to be recognized by the occupant that a braking force has been generated, and at the same time, the seatbelt device alternates tightening of the seatbelt and releasing thereof. With deceleration of such an automatic brake unit, the occupant is caused to bodily sense a deceleration force, and, in line therewith, is caused to bodily sense fluctuations resulting from tightening and releasing, which are brought about by the seatbelt of the seatbelt device. Thereby, the occupant is able to securely recognize the deceleration and seatbelt operation, and therefore an alarm can be issued to cause the occupant to recognize the situation without fail.

In the travel safety device for a vehicle, the safety device operation control unit may be constructed so that deceleration of a higher degree is generated by the automatic brake unit if such a state is maintained for a predetermined period of time, where the distance between the vehicle and an object enters a predetermined range on the basis of the correlation calculated by the correlation calculating unit.

Accordingly, when a state where the distance between the vehicle and an object is within a predetermined range is maintained for a predetermined period of time, that is, when the vehicle is not distanced from the object even though an alarm has been issued, the safety device operation control unit generates deceleration of a higher degree by the automatic brake unit. Therefore, should a contact occur, the damage can be reduced.

In the travel safety device for a vehicle, the safety device operation control unit may be constructed so that, if such a state is maintained for a predetermined period of time, where the distance between the vehicle and an object enters within a predetermined range on the basis of the correlation calculated by the correlation calculating unit, the seatbelt device causes the seatbelt to be fixed at its stopped state for at least a predetermined period of time after the seatbelt is tightened.

Accordingly, when such a state where the distance between the vehicle and an object enters a predetermined range is maintained for a predetermined period of time, that is, when the vehicle is not distanced from an object even though an alarm has been issued, since the safety device operation control unit fixes the seatbelt in its stopped state for at least a predetermined period of time after the seatbelt is tightened by the seatbelt device, it is possible to prevent a forward movement of an occupant due to an increase in the deceleration degree by the automatic brake unit. Therefore, it is possible for a driver to carry out an operation of preventing a contact with an object in a favorable posture.

The above-described travel safety device for a vehicle may be provided with a braking operation detecting unit for detecting a braking operation carried out by a driver and a vehicle speed detecting unit for detecting the vehicle speed, and the safety device operation control unit may be constructed so that fixing of the seatbelt in its stopped state by the seatbelt device is released at least at one of the states where it is detected, on the basis of a detection result of the braking operation detecting unit, that a braking operation is released after the braking operation is carried out by a driver and where it is detected, on the basis of a detection result of the vehicle speed detecting unit, that the vehicle stops.

Accordingly, if at least any one of the states is detected, where it is detected on the basis of a detection result of the braking operation detecting unit that a braking operation is released after the braking operation is carried out by a driver and where it is detected on the basis of a detection result of the vehicle speed detecting unit that the vehicle stops, the safety device operation control unit releases the fixing of the seatbelt in its stopped state by the seatbelt device, therefore, the safety device operation control unit does not need any reset switch.

The above-described travel safety device of a vehicle may be provided with a braking operation detecting unit for detecting a braking operation carried out by a driver, and the safety device operation control unit may be constructed so that, on the basis of a braking operation detected by the braking operation detecting unit, it determines whether or not there is a possibility of a contact between the vehicle and an object, and increases a tightening tension of the seatbelt by way of the seatbelt device in the case in which it is predicted, based on a braking operation carried out by a driver, that there is a possibility of a contact, prior to the case in which it is predicted, on the basis of the correlation between the vehicle and an object, which is calculated by the correlation calculating unit, that there is a possibility of a contact therebetween.

Accordingly, the tightening force of a seatbelt by the seatbelt device is increased in the case in which it is predicted on the basis of a braking operation carried out by a driver that there is a possibility of a contact, that is, where the deceleration degree is suddenly increased, prior to the case in which it is predicted on the basis of the distance between the vehicle and an object, which is calculated by the correlation calculating unit, that there is a possibility of a contact, wherein it is possible to suddenly prevent the forward motion of an occupant. Therefore, the driver is able to carry out a contact avoiding operation with an object in a favorable posture with respect to various types of conditions such as a sudden cutting-in of another vehicle from the side.

In the above-described travel safety device for a vehicle, the vehicle may be provided with an in-vehicle LAN, and the correlation calculating unit, a brake control unit for controlling the automatic brake unit and an electric seatbelt control unit for controlling the seatbelt device may be connected to a connection bus of the in-vehicle LAN.

Accordingly, as the correlation calculating unit calculates the correlation involving the distance between the vehicle and an object existing in the traveling direction thereof on the basis of a detection result of the object detecting unit, the safety device operation control unit determines, on the basis thereof, whether or not there is a possibility of a contact between the vehicle and the object. When there is a possibility of a contact, the safety device operation control unit simultaneously actuates the automatic brake unit and the seatbelt device, and issues an alarm to the occupant. Based thereon, it is possible to cause the occupant to recognize that there is a possibility of a contact. In addition, if the operation of the automatic brake unit is not at such a level at which the occupant is caused to adequately recognize that there is a possibility of a contact, it is possible to cause the occupant to recognize the possibility of a contact by operation of the seatbelt device, and it is possible to cause them to recognize that the automatic brake unit is operating to prevent the contact. Therefore, it is able to urge the driver to carry out a contact avoiding operation by suitably issuing an alarm to the driver.

Since the correlation calculating unit, the brake control unit for controlling the automatic brake unit and the electric seatbelt control unit for controlling the seatbelt device are connected to a connection bus of the in-vehicle LAN, the electric seatbelt control unit becomes able to control the seatbelt device, for example, on the basis of a control signal by the brake control unit, which is outputted based on a calculation result of the correlation calculating unit, wherein it is possible to easily control mutual timing of the brake operation and seatbelt operation.

The above-described travel safety device for a vehicle may be constructed so that the operation of the seatbelt device is made different in the case in which there is a possibility of a contact with a stationary object and in the case in which there is a possibility of a contact with a mobile object.

Accordingly, as the correlation calculating unit calculates the correlation involving the distance between the vehicle and an object existing in the traveling direction thereof on the basis of a detection result of the object detecting unit, the safety device operation control unit determines, on the basis thereof, whether or not there is a possibility of a contact between the vehicle and the object. When there is a possibility of a contact, the safety device operation control unit simultaneously actuates the automatic brake unit and the seatbelt device, and issues an alarm to the occupant. Based thereon, it is possible to cause the occupant to recognize that there is a possibility of a contact. In addition, even though the operation of the automatic brake unit is not at such a level at which the occupant is caused to adequately recognize that there is a possibility of a contact, it is possible to cause the occupant to recognize the possibility of a contact by operation of the seatbelt device, and it is possible to cause the occupant to recognize that the automatic brake unit is operating to prevent the contact. Therefore, it becomes possible to urge the driver to carry out a contact avoiding operation by suitably issuing an alarm to the driver.

Further, since the operation of the seatbelt device is made different in the case in which there is a possibility of a contact with a stationary object and in the case in which there is a possibility of a contact with a mobile object, it is possible to cause the occupant to recognize, by operation of the seatbelt device, whether the object which may collide with the vehicle is a stationary object or a mobile object.

The above-described travel safety device for a vehicle may further be provided with a collision sensor for detecting collision of the vehicle, and the safety device further provided with airbag devices, wherein the safety device operation control unit may be constructed so that it simultaneously actuates the automatic brake unit and the seatbelt device when it is predicted that there is a possibility of a contact, and actuates the airbag devices when the contact sensor detects contact of the vehicle.

Accordingly, as the correlation calculating unit calculates the correlation involving the distance between the vehicle and an object existing in the traveling direction thereof on the basis of a detection result of the object detecting unit, the safety device operation control unit determines, on the basis thereof, whether or not there is a possibility of a contact between the vehicle and the object. When there is a possibility of a contact, the safety device operation control unit simultaneously actuates the automatic brake unit and the seatbelt device, and issues an alarm to the occupant. Based thereon, it is possible to cause the occupant to recognize that there is a possibility of a contact. In addition, even though the operation of the automatic brake unit is not at such a level at which the occupant is caused to adequately recognize that there is a possibility of a contact, it is possible to cause the occupant to recognize the possibility of a contact by operation of the seatbelt device, and it is possible to cause the occupant to recognize that the automatic brake unit is operating to prevent the contact. Therefore, it becomes possible to urge the driver to carry out a contact avoiding operation by suitably issuing an alarm to the driver.

Also, since the airbag devices can be actuated due to the collision sensor's detecting collision of the vehicle after the automatic brake unit decelerates the vehicle and the seatbelt device tightens the seatbelt, the vehicle is adequately decelerated and the occupant is restrained when the airbag devices operate, and thus the airbag devices can be made small.

The present invention also provides a seatbelt device which includes a seatbelt for restraining an occupant of a vehicle in a seat, a contact predicting unit for predicting a possibility of a contact between the vehicle and an object, an electric motor for tightening the seatbelt when a contact is predicted by the contact predicting unit, a tightening releasing unit for releasing the tightening of the seatbelt and a control unit for controlling the electric motor and the tightening releasing unit, wherein the control unit carries out a warning operation to issue an alarm to the occupant by means of the seatbelt by controlling the electric motor and the tightening releasing unit so that tightening of the seatbelt and releasing thereof are alternated.

Accordingly, since the control unit controls the electric motor and the tightening releasing unit so that tightening of the seatbelt and releasing thereof are alternated, a warning operation is carried out, in which actuation of the seatbelt in the tightening direction and actuation thereof in the tightening releasing direction can be alternated. Therefore, the occupant is caused to bodily sense the actuation of the seatbelt in the tightening direction and the actuation thereof in the tightening releasing direction. Resultantly, it is possible to cause the occupant to recognize the same. That is, an alarm is issued to the occupant.

In the seatbelt device, the time of tightening the seatbelt in the warning operation may be set to be longer than the time of releasing the tightening thereof.

Thus, since the time of tightening the seatbelt in the warning operation is set to be longer than the time of releasing the tightening thereof, the amount of drive in the direction of releasing the tightening after the seatbelt is driven in the tightening direction can be reduced. As a result, it is possible to cause the occupant to bodily sense repetition of the actuation of the seatbelt in the tightening direction and in the releasing direction without sensing any incongruity. That is, an alarm can be issued to the occupant without them sensing any incongruity.

In the seatbelt device, the control unit may be constructed so that the warning operation is carried out on the basis of a predicting signal of the contact predicting unit.

Thus, since the control unit carries out a warning operation based on a predicting signal of the contact predicting unit for predicting a possibility of a contact of the vehicle, it is possible to issue an alarm to the occupant when a possibility of a contact of the vehicle is predicted.

In the seatbelt device, the control unit may be constructed so that, after the warning operation is carried out, a tightening operation of tightening the seatbelt by means of the electric motor is carried out.

Thus, since the control unit carries out a tightening operation of tightening the seatbelt by normally running the electric motor after a warning operation is carried out, the occupant is caused to recognize a possibility of a contact of the vehicle at an earlier stage than a tightening operation of the seatbelt, which is carried out when the possibility of a contact of the vehicle is increased, and are allowed to carry out a contact avoiding operation.

BEST MODE FOR CARRYING OUT THE INVENTION

A description is given of a travel safety device for a vehicle according to an embodiment of the invention with reference to the drawings.

Figure 1:
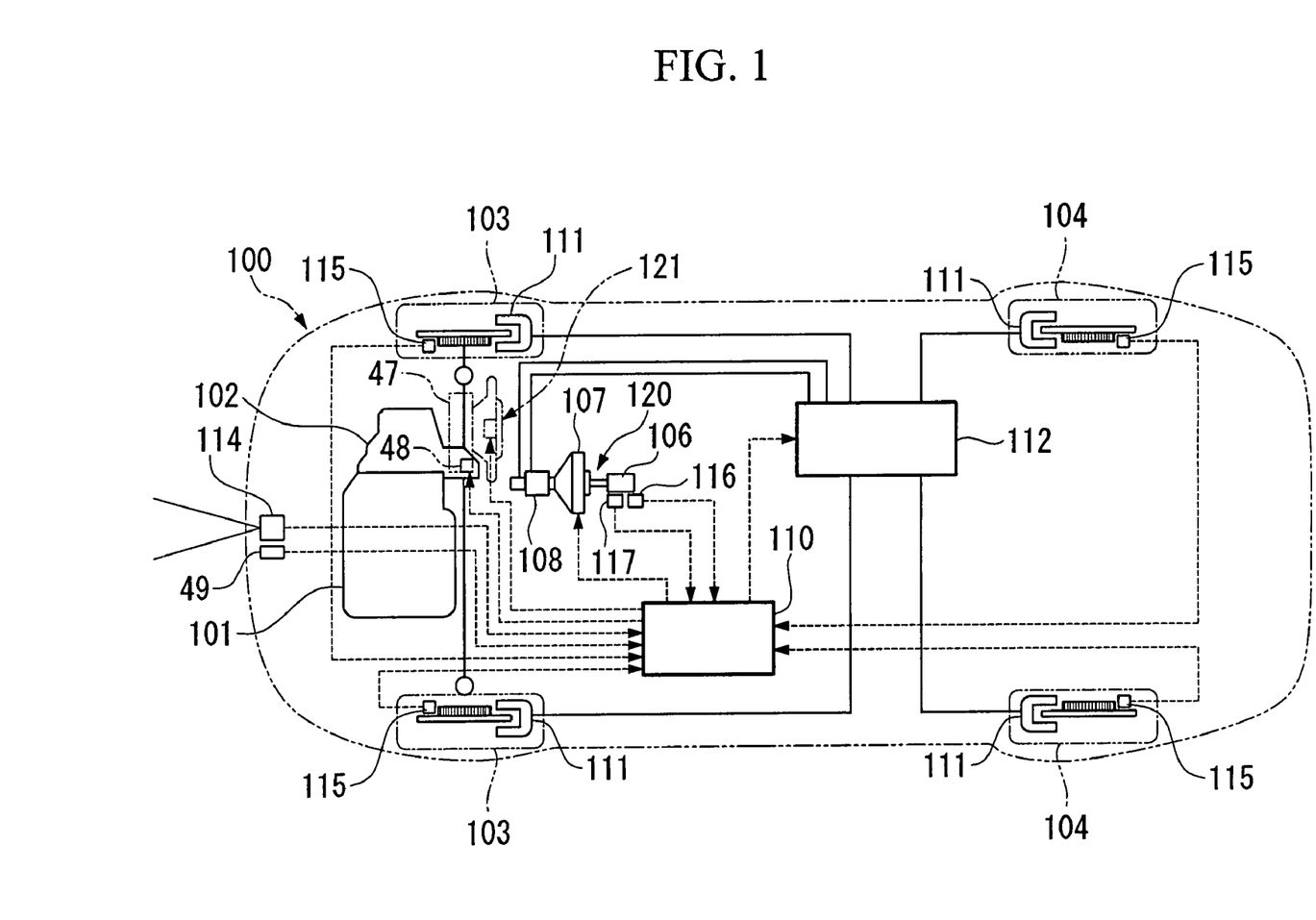
FIG. 1 is a general configurational view showing a travel safety device of a vehicle according for an embodiment of the invention.

FIG. 1 depicts a vehicle 100 to which the present embodiment is applied. The vehicle 100 includes left and right front wheels 103, that is, drive wheels to which a drive force of an engine 101 is transmitted via a transmission 102, and left and right rear wheels 104 that are driven wheels.

In addition, the vehicle 100 includes a brake pedal 106 operated by the driver, an electronic-controllable negative pressure booster 107 coupled to the brake pedal 106, and a master cylinder 108 coupled to the electronic-controllable negative pressure booster 107. Herein, the electronic-controllable negative pressure booster 107 not only actuates the master cylinder 108 by mechanically amplifying a depressing force of the driver which is applied to the brake pedal 106, but also actuates the master cylinder 108 by a signal from a control unit 11 without an operation of the brake pedal 106. Further, the master cylinder 108 generates fluid pressure in response to an output from the electronic-controllable negative pressure booster 107.

Further, the vehicle 100 includes brake calipers 111 for causing the wheels 103 and 104 to generate a braking force due to the fluid pressure introduced from the master cylinder 108 and decelerating the vehicle 100 and a pressure regulator 112 that is provided between the respective brake calipers 111 and the master cylinder 108 and regulates the fluid pressure outputted from the master cylinder 108 while being controlled by the control unit 110.

Figure 2:
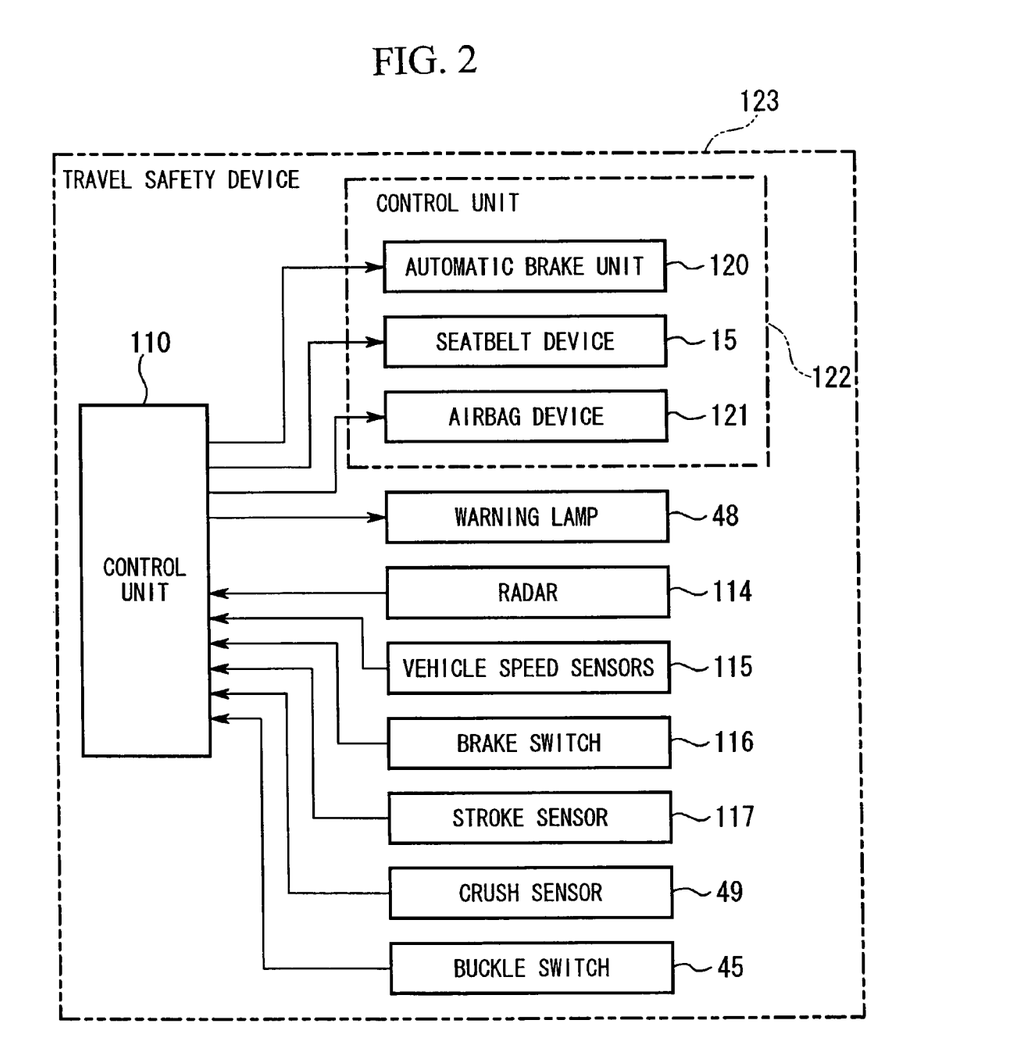
FIG. 2 is a block diagram showing the travel safety device according to the embodiment of the invention.
Figure 3:
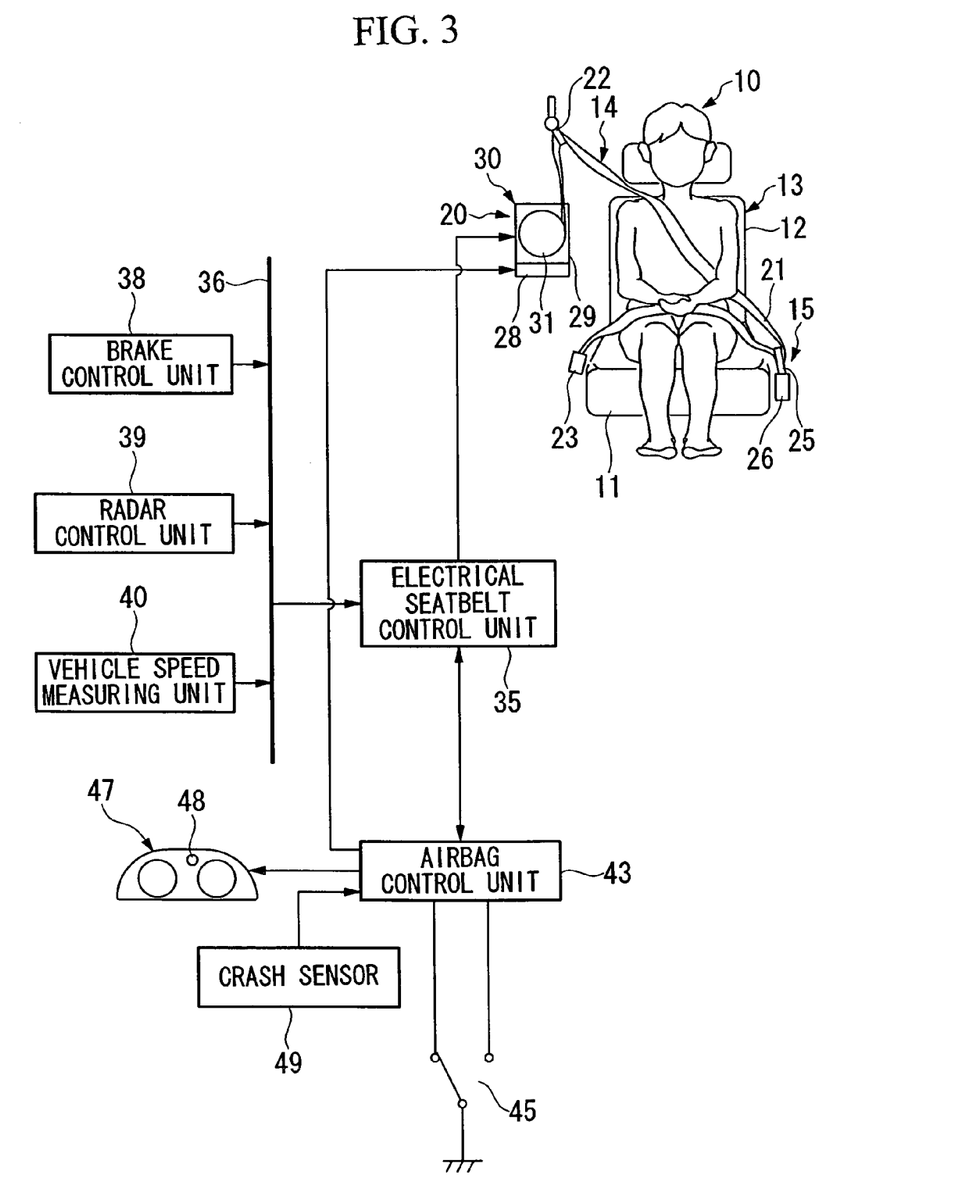
FIG. 3 is a general configurational view showing a seatbelt device and its related construction in the travel safety device according to the embodiment of the invention.

In addition, the vehicle 100 includes a radar (object detecting unit) 114 that is provided at the front part thereof and detects an object, possibly another vehicle, which exists ahead in the traveling direction of the vehicle, by emitting millimeter waves forward and by receiving reflected waves of the millimeter waves from the object, vehicle speed sensors (vehicle speed detecting units) 115 that are provided at positions corresponding to the respective wheels 103 and 104 and detect the vehicle speed, etc., based on rotation pulses of the respective wheels 103 and 104, a brake switch (brake operation detecting unit) 116 for detecting an operation of the brake pedal 106 executed by the driver, a stroke sensor (brake operation detecting unit) 117 for detecting an operation stroke of the brake pedal 106 executed by the driver, and a crush sensor (collision sensor) 49 provided at the front part to detect collision, a buckle switch 45 for detecting wearing of a seatbelt 14 of a seatbelt device shown in FIG. 3, and a warning lamp 48 provided in a meter unit 47 of the instrument panel. These components are connected to the control unit 110 as shown in FIG. 2.

Also, an automatic brake unit 120 that automatically decelerates the vehicle 100 by controlling a braking force of the vehicle 100 is composed of the electronically-controllable negative pressure booster 107, master cylinder 108 and brake calipers 111, which are depicted in FIG. 1. As shown in FIG. 2, a safety device 122 is composed of the automatic brake unit 120, the seatbelt device 15 for automatically tightening the seatbelt 14 and releasing the tightening thereof, and airbag devices 121 disposed at respective parts of the vehicle 100. Also, a travel safety device 123 according to the embodiment is composed of the safety device 122, radar 114, vehicle speed sensors 115, brake switch 116, stroke sensor 117, crush sensor 49, buckle switch 45, warning lamp 48 and control unit 110.

The control unit 110 calculates a correlation, involving the distance between the vehicle and an object ahead in the traveling direction, based on a result of detection by radar 114, specifically, the timing of transmitting and receiving millimeter waves, and simultaneously determines a possibility of a contact between the vehicle and an object ahead in the traveling direction based on the calculated correlation. When it is predicted that there is a possibility of a contact between the vehicle and an object ahead in the traveling direction, the control unit 110 controls operation of the safety device 122 composed of the automatic brake unit 120, seatbelt device 15 and airbag devices 121, which are provided in the vehicle.

The vehicle 100 is provided with seats 13, each of which includes a seat cushion 11 for supporting mainly the buttocks of the occupant 10 and a back rest 12 for supporting the back of the occupant 10 as shown in FIG. 3. The seatbelt device 15 that restrains the occupant 10 by using seatbelt 14 is provided for the seat 13. The seatbelt device 15 is of a so-called three-point type which is provided for the seat 13 of a driver. Also, the seatbelt device 15 is also provided for seats for passengers other than the driver as a matter of course.

In the seatbelt device 15, webbing 21 of the seatbelt 14 extends upward from a retractor 20 secured to the center pillar (not illustrated) or the like, at the outer side of the compartment with respect to the seat 13, and is inserted in a through anchor 22 supported at the upper part of the center pillar, and simultaneously the tip end of the webbing 21 is attached to the vehicle floor side via an outer anchor 23 at the outer side of the compartment with respect to the seat 13. The seatbelt 14 includes a tongue plate 25 through which a portion of the webbing 21 located between the through anchor 22 and the outer anchor 23 passes. The tongue plate 25 is detachably attached to a buckle 26 attached to the vehicle floor side inside the compartment with respect to the seat 13.

The occupant 10 seated in the seat 13 pull out the seatbelt 14 from the retractor 20 by pulling the tongue plate 25 and attaches the tongue plate 25 into the buckle 26, wherein a portion of the seatbelt 14 from the through anchor 22 to the tongue plate 25 draws mainly the portion from the shoulder to the breast of the occupant 10 into the seat 13 at the opposite side thereof, and a portion from the tongue plate 25 to the outer anchor 23 draws mainly the abdomen of the occupant 10 into the seat 13 at the opposite side thereof.

The retractor 20 is provided with an irreversible first pretensioner (irreversible seatbelt tightening unit) 28 that instantaneously retracts the seatbelt 14 with an explosive force using explosive powder. The first pretensioner 28 may be of an explosive type, a spring type, etc.

In addition, the retractor 20 is provided with a reversible second pretensioner 30 that tightens the seatbelt 14 by retracting the seatbelt 14 by the drive force of an electric motor 29. That is, the second pretensioner 30 is constructed so that it sends out the seatbelt 14 in the releasing direction by forcibly reversing a reel 31 in line with reversing of the electric motor 29 while it retracts the seatbelt 14 by forcibly turning the reel 31 for winding the webbing 21 into the retractor 20 in line with turning of the electric motor 29.

An electrical seatbelt control unit (safety device operation control unit) 35 which is a part of the control unit 110 for controlling the drive of the electric motor 29 is connected to the electric motor 29. The electrical seatbelt control unit 35 eliminates a slack of the seatbelt 14 in advance when a contact with a object ahead of the vehicle is predicted and restrains the occupant 10, and the electrical seatbelt control unit 35 also controls the electric motor 29 so as to automatically wind the seatbelt 14 into the retractor 20 when wearing of the seatbelt is ended. The electrical seatbelt control unit 35 is connected to a connection bus 36 of the in-vehicle LAN.

A brake control unit (safety device operation control unit) 38 that is a control unit for controlling a vehicle behavior stabilization control system to control behavior stabilization of the vehicle and is a part of the control unit 110, a radar control unit (correlation calculating unit, safety device operation control unit) 39 that is a control unit for controlling a preceding vehicle tracking control system to cause the vehicle to run while tracking the preceding vehicle and is a part of the control unit 110, and a vehicle speed measuring unit 40 that is a part of the control unit 110 are connected to the connection bus 36.

Also, an airbag control unit (safety device operation control unit) 43 that is a part of the control unit 110 and controls the operation of the airbag device 121 which is a seatbelt auxiliary tightening unit is connected to the electrical seatbelt control unit 35.

The brake control unit 38 carries out brake assistance control by, for example, predicting that a contact with an object ahead of the vehicle is possible if the brake control unit 38 detects an imminent brake operation based on output of the stroke sensor 117, which is a brake operation speed sensor, when the speed at which the brake pedal 106 is pressed is faster than a predetermined speed, wherein a BA signal is outputted to the electrical seatbelt control unit 35 during execution of the brake assistance control. In addition, the brake control unit 38 predicts that there is no possibility of a contact when the speed at which the brake pedal 106 is not pressed faster than the predetermined speed. In this case, no BA signal is outputted.

The preceding vehicle tracking control system includes the radar 114 such as a millimeter wave radar, which detects an object ahead in the traveling direction of the vehicle, (for example, a preceding vehicle). The radar 114 detects an object ahead, and on the basis of a detection signal of the radar 114, the radar control unit 39 controls the electronically-controllable negative pressure booster 107 that is a brake fluid pressure control unit of the automatic brake unit 120, and further controls the braking force of the vehicle 100. The radar control unit 39 also controls acceleration and deceleration by controlling a throttle actuator (not illustrated), and controls preceding vehicle tracking while keeping a predetermined distance between the preceding vehicle and the following vehicle. And further, the radar 114 detects an object ahead, and if the distance between the vehicle and the object ahead enters a predetermined range, the radar control unit 39 predicts that a contact of the vehicle 100 is possible based on the detection signal of the radar 114, and the radar control unit 39 carries out automatic brake control, which contributes to reducing damage due to a contact with an object ahead by controlling the electronically-controllable negative pressure booster 107, which is a brake fluid pressure control unit of the automatic brake unit 120, and by generating a braking force. Also, on the basis of a detection signal of the radar 114, unless the distance between the object ahead and the vehicle is within the predetermined range, the radar control unit 39 predicts that there is no possibility of a contact of the vehicle.

Herein, for example, if the object ahead is detected by the radar 114 and, on the basis of a detection signal of the radar 114, the distance to the object ahead is reduced to a predetermined range or less, the radar control unit 39 predicts that a contact between the object ahead and the vehicle 100 is possible, and carries out automatic brake control. Further, it is determined, on the basis of a difference in the relative speed between the object and the vehicle 100, whether the object is a stationary object or a mobile object. That is, the radar control unit 39 predicts a possibility of a contact with a stationary object ahead in the traveling direction of the vehicle and also predicts a possibility of a contact with a mobile object ahead in the traveling direction of the vehicle.

And, in the automatic brake control, if the radar control unit 39 determines that the object for which there is a possibility of a contact is a stationary object, the radar control unit 39 outputs, during execution of automatic brake control, a stationary object signal, which is a prediction signal showing that the vehicle is in a state where it is predicted that there is a possibility of a contact with the stationary object, to the electrical seatbelt control unit 35. On the other hand, if the radar control unit 39 determines that the object for which there is a possibility of a contact is a mobile object, the radar control unit 39 outputs, during execution of automatic brake control, a mobile object signal, which is a prediction signal showing that the vehicle is in a state where it is predicted that there is a possibility of a contact with the mobile object, to the electrical seatbelt control unit 35. In addition, unless under execution of automatic brake control, the radar control unit 39 does not output the stationary object signal or the mobile object signal.

Also, a vehicle speed signal from the vehicle speed sensor 115 is outputted from the vehicle speed measuring unit 40 to the electrical seatbelt control unit 35, and when the brake switch 116 is turned on, a brake signal is outputted to the electrical seatbelt control unit 35.

A buckle switch 45 for detecting whether or not the tongue plate 25 of the seatbelt 14 of the seatbelt device 15 is engaged with the buckle 26, that is, whether or not the seatbelt 14 is being worn is connected to the airbag control unit 43. Further, a warning lamp 48 secured in the meter unit 47 of the instrument panel is connected to the airbag control unit 43. In addition, a crush sensor 49 for detecting collision of the vehicle is connected to the airbag control unit 43.

And, the airbag control unit 43 controls operation of the respective airbag devices 121 and an explosive powder type first pretensioner 28, etc., on the basis of a buckle signal which is outputted from the buckle switch 45 when the tongue plate 25 is engaged with the buckle 26 and whose outputting from the buckle switch 45 is stopped when the tongue plate 25 is disengaged from the buckle 26, and a detection signal of the crush sensor 49.

Figure 4:
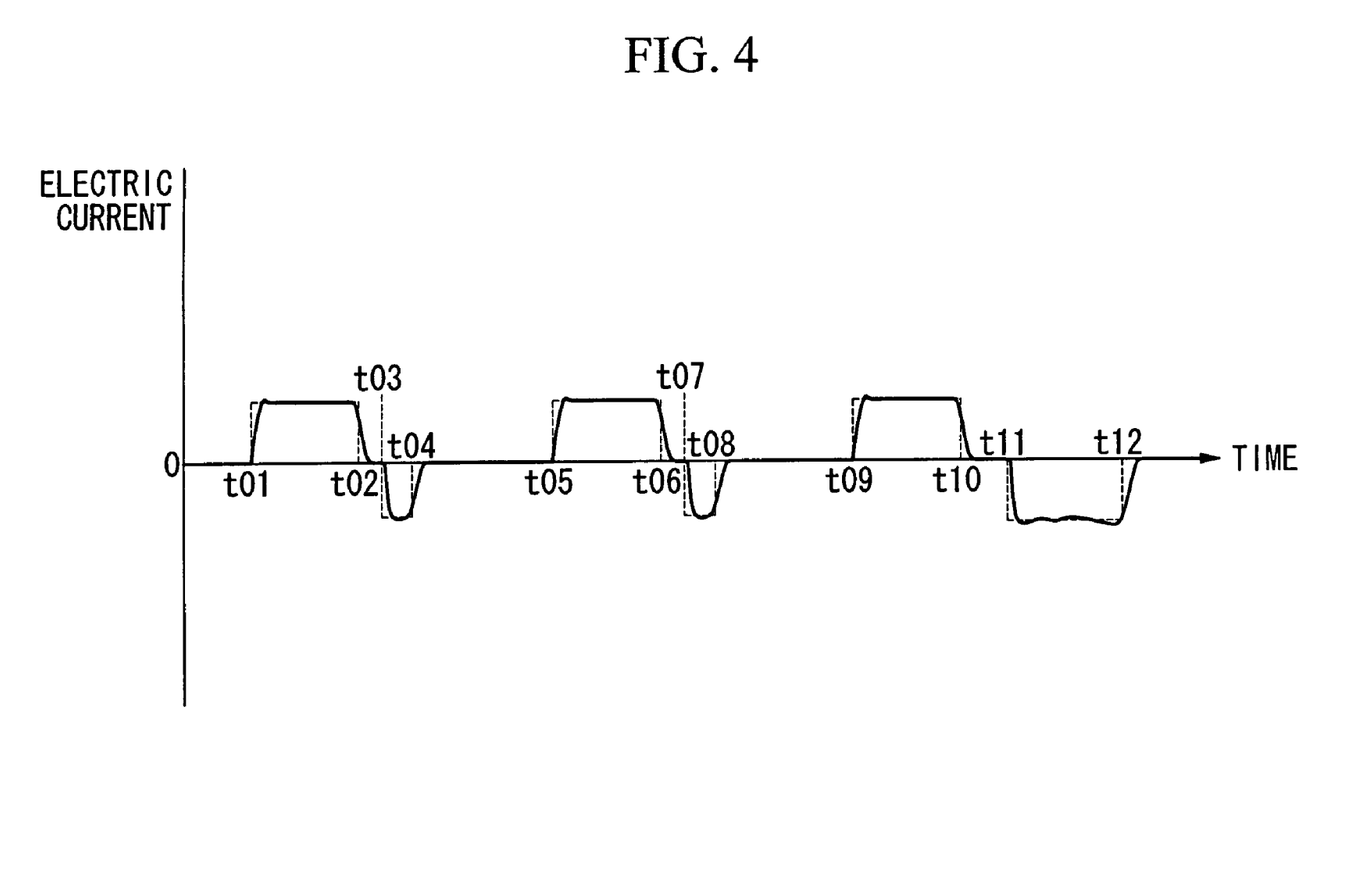
FIG. 4 is a linear diagram showing in time-series the current amount of an electric motor when the seatbelt device in the travel safety device according to the embodiment of the invention carries out a warning operation.

As shown in FIG. 4, the electrical seatbelt control unit 35 of the seatbelt device 15 according to the embodiment drives the electric motor 29 of the second pretensioner 30 so that the electric motor 29 repeats turning in the direction of tightening the seatbelt 14 and reversing in the direction of releasing the tightening of the seatbelt 14 alternately a predetermined number of times (specifically, three times) for a predetermined period of time, wherein a warning operation which issues an alarm to the occupant 10 is carried out by the seatbelt 14.

In detail, for the first time of turning and reversing in the warning operation, the drive time (from to t01 to t02 in FIG. 4) of turning of the electric motor 29 is set to a predetermined first turning drive time (for example, 100 ms), and the drive time (from t03 to t04 in FIG. 4) of reversing of the electric motor 29 is set to a predetermined first reversing time (for example, 50 ms), wherein the first turning drive time is set to be longer than the first reversing drive time. Also, the pause time (from t02 to t03 in FIG. 4) between turning and reversing is set to be a short predetermined first pause time (for example, 10 ms).

For the second time of turning and reversing, which are carried out with a pause time (for example, 150 ms) with respect to the first time of turning and reversing, the drive time (from t05 to t06 in FIG. 4) of turning of the electric motor 29 is set to a predetermined second turning drive time (for example, 100 ms), and the drive time (from t07 to t08 in FIG. 4) of reversing of the electric motor 29 is set to a predetermined second reversing drive time (for example, 50 ms), wherein the second turning drive time is set to be longer than the second reversing drive time. Also, the pause time (from t06 to t07 in FIG. 4) between turning and reversing is set to be a short predetermined second pause time (for example, 10 ms). That is, for the second time of turning and reversing, the turning drive time, the reversing drive time and the pause time between turning and reversing are set to the same lengths as those in the first time of turning and reversing.

For the third time of turning and reversing, which are carried out with a pause time (for example, 150 ms) with respect to the second time of turning and reversing, the drive time (from t09 to t10 in FIG. 4) of turning of the electric motor 29 is set to a predetermined third turning drive time (for example, 100 ms), and the drive time (from t11 to t12 in FIG. 4) of reversing of the electric motor 29 is set to a predetermined third reversing drive time (for example, 100 ms), wherein the third turning drive time and the third reversing drive time are set to the same duration of time. Also, the pause time (from t10 to t11 in FIG. 4) between turning and reversing is set to be a long predetermined third pause time (for example, 50 ms). That is, in the third time of turning and reversing, the turning drive time and reversing drive time of the electric motor 29 are set to the same duration of time as the first and second turning drive times, and the pause time between turning and reversing are set to be longer than the first time and second pause times.

Also, in the first time through the third time, the drive current for turning is controlled so as to become a predetermined first drive amount (for example, 3 A), and the drive current for reversing is controlled so as to become a predetermined second drive amount (for example, 7 A in the inverted direction). Herein, in FIG. 4, the broken lines indicate control targets of current values while the solid lines indicate actual operation current values.

Figure 5:
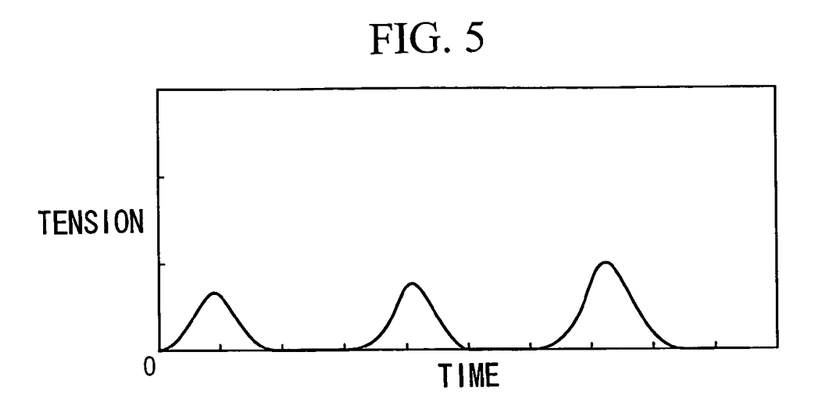
FIG. 5 is a linear diagram showing in time-series the tension generated when the seatbelt device in the travel safety device according to the embodiment of the invention carries out a warning operation.

By such a warning operation, as shown in FIG. 5, generation of tension by winding the seatbelt 14, that is, driving the same in the tightening direction, and releasing of tension by unwinding the seatbelt 14, that is, driving the same in the releasing direction are repeated a plurality of times within a predetermined duration of time, whereby an alarm is issued to the occupant 10 by means of the seatbelt 14.

And, the electrical seatbelt control unit 35 of the seatbelt device 15 controls the electric motor 29 in accordance with a predicting result of the brake control unit 38 and radar control unit 39, which predict a possibility of a contact of the vehicle, and carries out a tightening operation to generate tension of the seatbelt 14. Also, the electrical seatbelt control unit 35 carries out a tightening operation at the earliest timing of determination among a predicting determination timing when the radar control unit 39 predicts a possibility of a contact with a stationary object ahead in the traveling direction of the vehicle (that is, at the moment when a stationary object signal is generated), a predicting determination timing when the radar control unit 39 predicts a possibility of a contact with a mobile object ahead in the traveling direction of the vehicle (that is, at the moment when a mobile object signal is generated), and a predicting determination timing when the brake control unit 38 determines that a possibility of a contact is predicted based on an operation speed of the brake pedal (that is, at the moment when a BA signal is generated).

Further, the electrical seatbelt control unit 35 causes the seatbelt 14 to generate different amount of tension in accordance with a result of predicting a possibility of a contact by the brake control unit 38 or results of predicting a possibility of a contact by the radar control unit 39. In detail, the electric motor 29 is controlled so that tension F2, generated by the electric motor 29 when the radar control unit 39 predicts a possibility of a contact with a mobile object ahead in the traveling direction of the vehicle, and tension F1, generated by the electric motor 29 when the brake control unit 38 predicts a possibility of a contact based on the operation speed of the brake pedal 106 become greater than tension F3, generated by the electric motor 29 when the radar control unit 39 predicts a possibility of a contact with a stationery object ahead in the traveling direction of the vehicle.

For example, when the possibility of a contact is predicted based on the brake operation, the current value of the electric motor 29 is controlled so as to be brought into the first predetermined range (for example, 10 A through 20 A) in order to cause the first predetermined value of tension (for example, 100 N) as the tension F1 to be generated for the seatbelt 14. Also, when the possibility of a contact with a mobile object is predicted, the current value of the electric motor 29 is controlled so as to be brought into the second predetermined range (for example, 10 A through 20 A) in order to cause the second predetermined value of tension (for example, 100 N) as the tension F2 to be generated for the seatbelt 14. Further, when the possibility of a contact with a stationary object is predicted, the current value of the electric motor 29 is controlled so as to be brought into the third predetermined range (for example, 6 A through 10 A) in order to cause the third predetermined value of tension (for example, 50 N) as the tension F3 to be generated for the seatbelt 14. In the example, the first predetermined value representing the tension F1 and the second predetermined value representing the tension F2 are set to be the same. As a result, the first predetermined range of the current value is set to be equal to the second predetermined range of the current value.

In addition, in restraining operations in the case in which a possibility of a contact with a stationary object is predicted, a possibility of a contact with a mobile object is predicted, or a possibility of a contact is predicted based on the brake operation, the electrical seatbelt control unit 35 temporarily increases the current value of the electric motor 29 at the beginning when the seatbelt 14 is caused to generate tension by which the occupant 10 is secured or restrained, by controlling the electric motor 29. That is, within a predetermined duration of time immediately after rotation of the electric motor 29 is started, the current limit is made higher than the current limit required when generating the tension established by a restraining operation.

Figure 6:
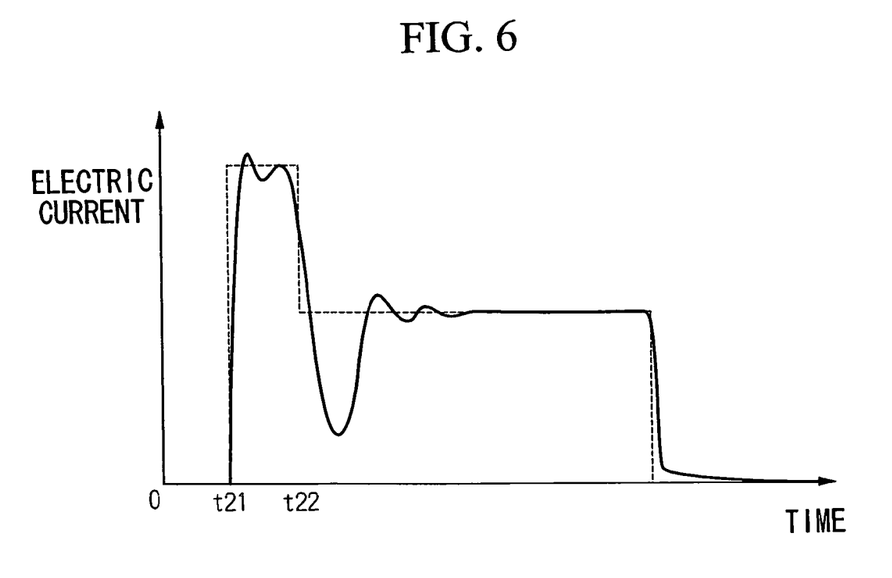
FIG. 6 is a linear diagram showing in time-series the current amounts of an electric motor when the seatbelt device in the travel safety device according to the embodiment of the invention predicts a possibility of a contact with a mobile object and predicts a possibility of a contact based on the brake operation.
Figure 7:
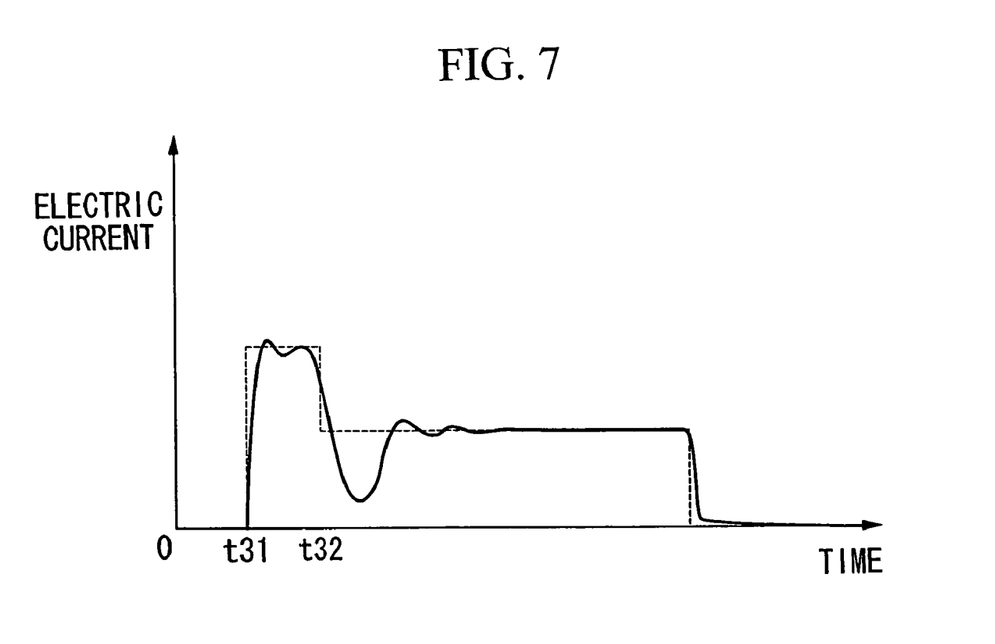
FIG. 7 is a linear diagram showing in time-series the current amount of an electric motor when the seatbelt device in the travel safety device according to the embodiment of the invention predicts contact with a stationary object.

Specifically, when the possibility of a contact is predicted based on the brake operation, shown in FIG. 6 as from t21 to t22, the current limit is set at the first initial limit value (for example, 20 A) for a predetermined first initial time (for example, 50 ms) immediately after rotation of the electric motor 29 is started, and thereafter, the current limit is set to a predetermined first limit value (for example, 10 A) which is lower than the first initial limit value. Also, when the possibility of a contact with a mobile object is predicted, shown in FIG. 6 as from t21 to t22, the current limit is set at a predetermined second initial limit value (for example, 20 A) for a predetermined second initial time (for example, 50 ms) immediately after rotation of the electric motor 29 is started, and thereafter, the current limit is set to a predetermined second limit value (for example, 10 A) which is lower than the second initial limit value. Further, when the possibility of a contact with a stationary object is predicted, shown in FIG. 7 as from t31 to t32, the current limit is set at a predetermined third initial limit value (for example, 10 A) for a predetermined third initial time (for example, 50 ms) immediately after rotation of the electric motor 29 is started, and thereafter, the current limit is set to a predetermined third limit value (for example, 6 A) which is lower than the third initial limit value. In the example, since the first predetermined value representing the tension F1 is equal to the second predetermined value representing the tension F2, the first initial limit value and the second initial limit value are set to be equal to each other, and at the same time, the first limit value and the second limit value are also set to be equal to each other. Herein, in FIG. 6 and FIG. 7, the broken lines indicate control targets of the current values, and the solid lines indicate actual operation current values.

Also, the electric motor 29 may be controlled so that the tension F2 when predicting a possibility of a contact with a mobile object is made greater than the tension F3 when predicting a possibility of a contact with a stationary object, and simultaneously the tension F1 when predicting a possibility of a contact based on the brake operation is made greater than the tension F2 when predicting a possibility of a contact with a mobile object (That is, F3<F2<F1).

That is, the electrical seatbelt control unit 35 determines a possibility of a contact between the vehicle 100 and an object based on an operation of the brake pedal 106, which is detected by a stroke sensor 117 and outputted by the brake control unit 38, and if a possibility of a contact is predicted based on a brake operation of the driver, the electrical seatbelt control unit 35 increases the restraining tension of the seatbelt 14 made by the seatbelt device 15 even though a possibility of a contact is also predicted based on the distance between the vehicle 100 and an object which is calculated by the radar control unit 39.

In this case, for example, the third predetermined range of the current value of the electric motor 29 is controlled so as to become, for example, 6 A through 10 A when the possibility of a contact with a stationary object is predicted, and at the same time, the second predetermined range of the current value of the electric motor 29 is controlled so as to become, for example, 10 A through 20 A when the possibility of a contact with a mobile object is predicted. Also, the first predetermined range of the current value of the electric motor 29 is controlled so as to become, for example, 20 A through 25 A when the possibility of a contact is predicted based on the brake operation. In this case, the first initial limit value is set higher than the second initial limit value, and the first limit value is set higher than the second limit value.

Hereinafter, a description is given, in time series, of one example of respective operations of the travel safety device 123 according to the embodiment along with generation states of deceleration degrees with reference to FIG. 8.

In the case in which the radar 114 detects an object ahead (for example, a vehicle existing ahead) and that the distance to the forward object is reduced to a predetermined value or less, the radar control unit 39 commences automatic brake control (t41 in FIG. 8) based on a detection signal of the radar 114, and outputs a stationary object signal when the forward object is a stationary object, or a mobile object signal when the forward object is a mobile object, and in the initial stage (from t41 to t42 in FIG. 8) the occupant is notified of the distance to the forward object being reduced, by means of sound by an alarm buzzer or the like, by driving a sound output unit and display by lighting of the warning lamp 48 (primary warning) or the like. That is, when there is a possibility of a contact with a forward object or when the distance between vehicles has shortened, the occupant is notified of the same by means of sound and visual display, thereby urging the driver to carry out an avoiding operation. At this time, no deceleration is executed.

Figure 8:
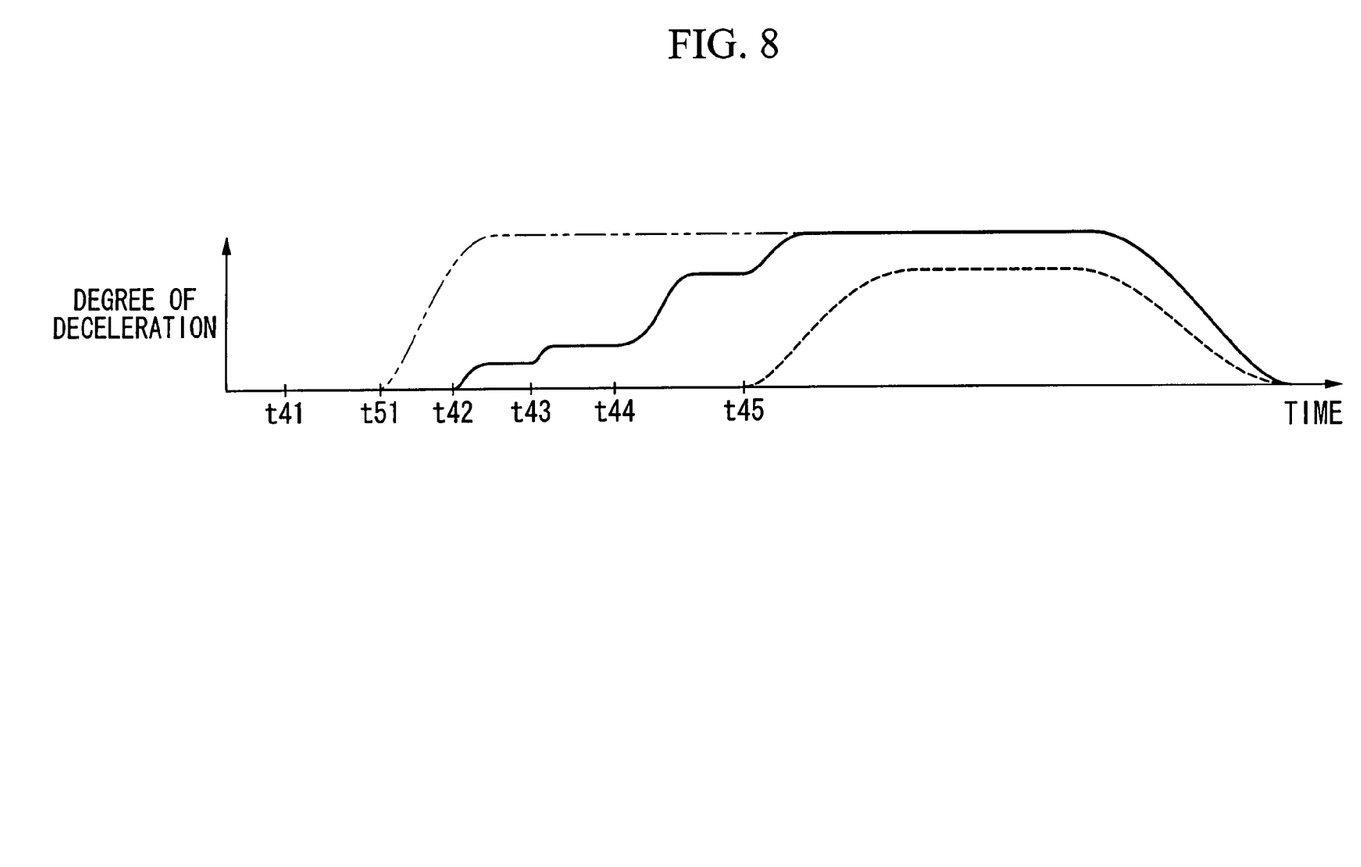
FIG. 8 is a linear diagram showing in time-series one example of respective operation timing of the seatbelt device in the travel safety device according to the embodiment of the invention, and deceleration degrees generated at the respective timing.

Next, if the state where the distance to the object ahead is reduced to a predetermined value or less is maintained for a predetermined duration of time (for example, 1 second) even though a sound output is issued, the radar control unit 39 controls the electronically-controllable negative pressure booster 107 that is a brake fluid pressure control unit, and generates a braking force so that the vehicle obtains a predetermined degree of deceleration, whereby the first stage of a deceleration generating operation is carried out, by which the occupant is caused to bodily sense through the deceleration that the braking force is being generated (from t42 to t43 in FIG. 8).

Further, if the state where the distance to the object ahead is reduced to a predetermined value or less is maintained for a predetermined duration of time (for example, 0.5 seconds) even after generation of the deceleration, the radar control unit 39 controls the electronically-controllable negative pressure booster 107 that is the brake fluid pressure control unit of the automatic brake unit 120 and generates a braking force so that the vehicle obtains a further higher degree of deceleration, whereby the second stage of deceleration generation is carried out, by which the occupant is notified of generation of the braking force (from t43 to t44 in FIG. 8).

On the other hand, in a state where automatic brake control is being carried out in a state where the radar control unit 39 predicts that there is a possibility of a contact with a mobile object ahead of the vehicle, the electrical seatbelt control unit 35 receives a mobile object signal. If the mobile object signal continues to be inputted to the electrical seatbelt control unit 35 for the predetermined time which is the same length of time as to generate the braking force (for example, 1 second) in the above-mentioned condition (t42 in FIG. 8), the electrical seatbelt control unit 35 carries out a warning operation using the seatbelt 14 to issue an alarm to the occupant on the basis of the mobile object signal, by driving the electric motor 29 of the second pretensioner 30 so that turning in the direction of tightening the seatbelt 14 and reversing in the direction of releasing the tightening of the seatbelt 14 are alternated a plurality of times under the condition that a buckle signal is outputted from the buckle switch 45 is inputted to the electrical seatbelt control unit 35 via the airbag control unit 43.

As shown in FIG. 4, the warning operation is brought about by turning the electric motor 29 for a predetermined first turning drive time (for example, 100 ms), stopping it for a predetermined first pause time (for example, 10 ms), reversing it for a predetermined first reversing drive time (for example, 50 ms) and stopping it for a predetermined pause time (for example, 150 ms), turning the electric motor 29 for a predetermined second turning drive time (for example, 100 ms), stopping it for a predetermined second pause time (for example, 10 ms), reversing it for a predetermined second reversing drive time (for example, 50 ms), stopping it for a predetermined pause time (for example, 150 ms), turning the electric motor 29 for a predetermined third turning drive time (for example, 100 ms), stopping it for a predetermined third pause time (for example, 50 ms), and reversing it for a predetermined third reversing drive time (for example, 100 ms).

Based on the above-described warning operation, as shown in FIG. 5, the generation of tension by winding the seatbelt 14, that is, tightening thereof, and the releasing of the tension by unwinding the seatbelt 14, that is, releasing of the tightening are alternated, wherein an alarm is issued to the occupant via the seatbelt 14. Also, the warning operation is established so as to be carried out almost simultaneously with the above-described deceleration generation (t42 through t44 in FIG. 8). Herein, along with the warning operation, visual warning by means of the warning lamp 48, etc., acoustic warning by means of a sound output unit, and other warnings by means of still another warning units may be available, or any combination of these warning units may be possible.

That is, if a state where the distance between the vehicle 100 and an object is within a predetermined range based on the calculated correlation is maintained for a predetermined duration of time even though the primary warning is generated, it is determined that the vehicle approaches the object more than when the primary warning is generated, and the radar control unit 39 causes the automatic brake unit 120 to execute light braking and to generate deceleration of a degree, by which the occupant can be notified of generation of a braking force, in addition to a sound by an alarm buzzer or the like, and display by lighting of the warning lamp 48 or the like, and at the same time, the electronic seatbelt controlling unit causes the seatbelt device 15 to repeatedly execute light tightening of the seatbelt 14 and release the tightening thereof alternately (secondary warning). That is, when the vehicle approaches the object more than when the primary warning is generated, the occupant is notified of the approach by the degree of deceleration and tightening of the seatbelt 14 in addition to the sound and visual display, thereby urging the driver to carry out an avoiding operation.

As described above, where it is predicted on the basis of the calculated correlation that there is a possibility of a contact between the vehicle 100 and an object, the radar control unit 39 and the electrical seatbelt control unit 35 simultaneously actuate the automatic brake unit 120 and the seatbelt device 15.

If a state where the distance between the vehicle and an object ahead is reduced to a predetermined amount or less is maintained for a predetermined duration of time (for example, 2 seconds) even though the secondary warning in which the deceleration generation operation and warning operation are added is carried out, the radar control unit 39 controls the electronically-controllable negative pressure booster 107 that is the brake fluid pressure control unit and carries out an automatic emergency brake operation (after t44 in FIG. 8) by which a braking force is generated so that the vehicle is able to obtain a further higher predetermined degree of deceleration.

That is, the radar control unit 39 generates a further higher degree of deceleration by the automatic brake unit 120 based on the calculated correlation if a state where the distance between the vehicle 100 and an object enters a predetermined range is maintained for a predetermined duration of time.

On the other hand, when the radar control unit 39 predicts that there is a possibility of a contact with an object ahead of the vehicle and outputs a stationary object signal or a mobile object signal to the electric seatbelt control unit 35 during execution of automatic brake control, if the electric seatbelt control unit 35 determines based on the inputted signal that the same predetermined time (for example, 2 seconds) as that for determining commencement of the automatic emergency brake operation in a state where an input of the signal maintains elapses (t44 in FIG. 8), the electric seatbelt control unit 35 carries out winding and tightening of the seatbelt 14 by turning the electric motor 29 for a predetermined turning duration of time (for example, 1 second), after that, the electric seatbelt control unit 35 carries out a restraining operation for fixing (that is, releasing is made impossible) the retractor 20 at least for a predetermined duration of time (for example, 2 seconds) by means of the electric motor 29, thereby restraining the occupant 10 in the seat 13 by means of the seatbelt 14.

That is, if a state where the distance between the vehicle 100 and an object enters within a predetermined range based on the correlation calculated by the radar control unit 39 is maintained for a predetermined duration of time, the electrical seatbelt control unit 35 fixes the seatbelt 14 in a stopped state for at least a predetermined duration of time after tightening the seatbelt 14 by means of the seatbelt device 15.

Herein, where a stationary object signal is outputted in the restraining operation, that is, when it is predicted that there is a possibility of a contact with a stationary object ahead of the vehicle, the current value is temporarily increased by setting the current limit to a predetermined third initial limit value (for example, 10 A) for a predetermined third initial time (for example, 50 ms) immediately after rotation of the electric motor 29 is commenced, and slack of the seatbelt 14 is immediately removed. On the other hand, the current limit thereafter is set to a predetermined third limit value (for example, 6 A) which is lower than the third initial limit value to lower the current value, and the tension of the third predetermined value (for example, 50 N) is generated for the seatbelt 14 as the tension F3. Also, where a mobile object signal is outputted in the restraining operation, that is, when it is predicted that there is a possibility of a contact with a mobile object (a preceding vehicle) ahead of the vehicle, the current value is temporarily increased by setting the current limit to a predetermined second initial limit value (for example, 20 A) for a predetermined second initial time (for example, 50 ms) immediately after rotation of the electric motor 29 is commenced, and slack of the seatbelt 14 is immediately removed. On the other hand, the current value thereafter is set to a predetermined second limit value (for example, 10 A) which is lower than the second initial limit value to lower the current value, and the tension of the second predetermined value (for example, 100 N) is generated for the seatbelt 14 as the tension F2.

That is, if a state where the distance between the vehicle 100 and an object enters a predetermined range on the basis of the calculated correlation is maintained for a predetermined duration of time even though the above-described secondary warning is issued, it is determined that the vehicle approaches an object ahead more than at the time of the secondary warning and that it is difficult to avoid a contact with the object, the radar control unit 39 carries out intensive braking by the automatic brake unit 120 in addition to activating a sound such as an alarm buzzer and display such as lighting of the warning lamp 48, and at the same time, the electric seatbelt control unit carries out intensive tightening of the seatbelt 14 by means of the seatbelt device 15. That is, where the vehicle approaches the object more than at the time of the secondary warning, sound and visual display are brought about, and simultaneously a greater degree of deceleration is generated, and damage from any contact is limited. Furthermore, forward movement of the occupant due to an increase in the degree of deceleration brought about by the automatic brake unit 120 can be prevented by intensive restraining of the seatbelt 14. Simultaneously, a driver restraining effect can be increased by an irreversible first pretensioner 28 described later.

After that, in the case in which an operation of the brake pedal 106 is cancelled and a brake signal from the brake switch 116 is stopped, or it is determined based on an output of the vehicle speed sensor 115 that the vehicle speed becomes zero after a brake operation is carried out by the driver and a brake signal is outputted from the brake switch 116 (t45 in FIG. 8), the electric seatbelt control unit 35 releases fixing of the retractor 20 in a stopped state via the electric motor 29, that is, ends the restraining operation.

That is, in at least one of the states where it is detected on the basis of a detection result of the brake switch 116 that a brake operation is cancelled after the brake operation is carried out by the driver, and where it is detected on the basis of a detection result of the vehicle speed sensor 115 that the vehicle 100 stops, the electrical seatbelt control unit 35 ends fixing of the seatbelt 14 in a stopped state by the seatbelt device 15. In addition, the broken line in FIG. 8 indicates a deceleration segment produced by the brake operation carried out by the driver.

Also while traveling, it is determined on the basis of output of the stroke sensor 117, which is a brake operation speed sensor, that the speed at which the brake pedal 106 is stepped on is faster than a predetermined speed and the brake operation is imminent, the brake control unit 38 predicts that there is a possibility of a contact with an object ahead of the vehicle and carries out brake assistance control. As a result, the degree of deceleration is instantaneously increased (that is, as shown by a two-dashed broken line in FIG. 8). The electric seatbelt control unit 35 carries out the above-described tightening operation during execution of the brake assistance control, prior to the tightening operation based on the correlation calculated by the radar control unit 39, thereby restraining the occupant 10 in the seat 13 by means of the seatbelt 14.

Further, if the crush sensor 49 detects a collision of the vehicle, the airbag control unit 43 inflates the airbag devices 121, and at the same time, ignites an explosive type first pretensioner 28 to cause the seatbelt 14 to be instantaneously retracted to tighten the same.

That is, the airbag control unit 43 controls the operations of the airbag devices 121 and the irreversible first pretensioner 28 when the crush sensor 49 detects a collision of the vehicle.

As described above, the automatic brake unit 120 is capable of decelerating the vehicle in accordance with a plurality of different deceleration patterns, and the seatbelt 15 is capable of tightening the seatbelt 14 and releasing the tightening thereof in accordance with a plurality of different operation patterns. In addition, the automatic brake unit 120 is provided with a switch by which the driver can turn off the travel safety device 123 by a manual operation.

With the travel safety device 123 for a vehicle according to the embodiment described above, when the radar control unit 39 calculates the correlation including the distance between the vehicle 100 and an object existing in the traveling direction on the basis of a detection result of the radar 114, it is determined that there is a possibility of a contact between the vehicle 100 and the object on the basis of the correlation. When there is a possibility of a contact, the radar control unit 39 automatically decelerates the vehicle 100 by the automatic brake unit 120 which is a safety device 122 secured in the vehicle 100, and simultaneously carries out tightening of the seatbelt 14 and releasing the tightening thereof by the seatbelt device 15 in line therewith. The occupant is caused to bodily sense the deceleration force by deceleration brought about by such an automatic brake unit 120, and the occupant is also caused to bodily sense shaking by the seatbelt 14 based on tightening of the seatbelt 14 by the seatbelt device 15 and releasing of the tightening thereof, which are carried out in line with the deceleration. That is, an alarm is issued to the occupant. Therefore, it is made possible for the driver to carry out a contact avoiding operation by suitably issuing an alarm to him. Accordingly, it is possible for the occupant in the front passenger's seat, etc., to prepare a posture against a contact. In addition, even if the operation of the automatic brake unit 120 is not at such a level at which it is possible to cause the occupant to adequately recognize that there is a possibility of a contact, the occupant can be caused to recognize the same by operation of the seatbelt device 15, and it is possible to cause the occupant to clearly recognize that the automatic brake unit 120 is operating for avoidance of the contact.

Also, since the automatic brake unit 120 is capable of decelerating the vehicle 100 in a plurality of different patterns and the seatbelt device 15 is capable of tightening the seatbelt 14 and releasing the tightening thereof in a plurality of different operation patterns, the degree of deceleration and the operations of the seatbelt 14 can be made different when an alarm is issued to the driver and when an avoiding operation is carried out. Further, it is possible to make the deceleration of the vehicle 100 and operation of the seatbelt 14 different in accordance with the degree of emergency.

Still further, when the distance between the vehicle 100 and an object enters a predetermined range, the radar control unit 39 generates, by the automatic brake unit 120, a deceleration of a degree by which the occupant is caused to recognize that a braking force is generated, and at the same time, the electronic seatbelt control unit alternates tightening of the seatbelt 14 and releasing of the tightening thereof by the seatbelt device 15, and it is possible for the occupant to securely recognize the same. Therefore, an alarm is issued so that the occupant can recognize the same without fail.

In addition, when a state where the distance between the vehicle 100 and an object enters a predetermined range is maintained for a predetermined duration of time, that is, when the distance between the vehicle and an object is not increased even though an alarm is issued, the radar control unit 39 generates a further higher degree of deceleration by means of the automatic brake unit 120. Therefore, should any contact occur, damage can be reduced.

Further, when a state where the distance between the vehicle 100 and an object enters a predetermined range is maintained for a predetermined duration of time, that is, where the distance between the vehicle 100 and an object is not increased even though an alarm is issued, the electrical seatbelt control unit 35 fixes the seatbelt 14 in a stopped state for at least a predetermined duration of time after it tightens the seatbelt 14 by the seatbelt device 15. Therefore, it is possible to prevent the occupant from moving forward in line with an increase in the deceleration degree by the automatic brake unit 120. Accordingly, it is possible for the driver to carry out a contact avoiding operation with an object in a favorable posture.

In addition, if one of the states is detected where it is detected on the basis of a detection result of the brake switch 116 that a brake operation is ended after the brake operation is carried out by the driver and where it is detected on the basis of a detection result of the vehicle speed sensor 115 that the vehicle 100 stops, the electrical seatbelt control unit 35 ends fixing of the seatbelt 14 in a stopped state by the seatbelt device 15, and no reset switch is required.

Also, when it is determined on the basis of a brake operation of the driver in accordance with a detection result of the stroke sensor 117 that there is a possibility of a contact, that is, where the degree of deceleration is suddenly increased, the tightening tension of the seatbelt 14 by the seatbelt device 15 is increased prior to the case in which it is determined on the basis of the distance between the vehicle 100 and an object, which is calculated by the radar control unit 39, that there is a possibility of a contact. Therefore, it is possible to immediately prevent forward movement of the occupant. Accordingly, with regard to various patterns such as a sudden cutting-in of another vehicle from the side, the occupant 10 can carry out a contact avoiding operation with an object in a favorable posture.

In addition, where the crush sensor 49 detects a contact of the vehicle 100, it is possible to actuate the airbag devices 121 and the first pretensioner 28 for carrying out irreversible tightening of the seatbelt by means of the airbag control unit 43. Therefore, the occupant can be restrained in the seat 13 by the first pretensioner 28 without fail when the vehicle 100 collides, and the airbag devices 121 can be operated, and damage due to the contact can be reduced.

Further, since the first pretensioner 28 can be actuated after deceleration is carried out by the automatic brake unit 120, the first pretensioner 28 can be made small-sized. Further, it is possible to operate the airbag unit 121 and the first pretensioner 28 at the same time by detection of a collision of the vehicle by means of the crush sensor 49.

Also, since it is possible to actuate the airbag devices 121 based on detection of a collision of the vehicle by means of the crush sensor 49 after the automatic brake unit 120 decelerates the vehicle speed and the seatbelt 14 is tightened by the seatbelt device 15, the vehicle can be sufficiently decelerated when the airbag devices 121 operate and the driver is restrained, and the airbag devices 121 can be made small in size.

In addition, since the radar control unit 39, brake control unit 38, and electrical seatbelt control unit 35 are connected to the connection bus 36 of the in-vehicle LAN, respective timing of the brake operation and seatbelt operation can be controlled easily. For example, the electrical seatbelt control unit 35 becomes able to control the seatbelt device 15 on the basis of a BA signal of the brake control unit 38, which is outputted based on a calculation result of the radar control unit 39.

Further, since the operations of the seatbelt device 15 are made different where there is a possibility of a contact with a stationary object and where there is a possibility of a contact with a mobile object, it is possible to cause the occupant to recognize, by the operations of the seatbelt device 15, whether the object that is brought into contact with the vehicle is a stationary object or a mobile object.

Also, the seatbelt device 15 brings about the following effects.

Since the electrical seatbelt control unit 35 drives the electric motor 29 so as to alternate turning and reversing, such warning operation can be executed, in which drive of the seatbelt 14 in the tightening direction and drive in the releasing direction of the tightening are alternated. Therefore, the occupant 10 is caused to bodily sense drive in the tightening direction of the seatbelt 14 and drive in the releasing direction thereof. As a result, the occupant 10 can recognize the same. That is, an alarm can be issued to the occupant 10 by means of the seatbelt 14.

Further, since, in the warning operation, the drive time of turning of the electric motor 29 for tightening the seatbelt 14 is set to be longer than the drive time of reversing to loosen the seatbelt 14 immediately after that, the amount of releasing the tightening after the seatbelt 14 is tightened can be reduced. As a result, the occupant 10 is caused to bodily sense repetition of drive in the tightening direction of the seatbelt 14 and drive in the releasing direction thereof without feeling any incongruity. That is, it is possible to issue an alarm to the occupant 10 without the driver sensing any incongruity.

Further, since the electrical seatbelt control unit 35 carries out a warning operation on the basis of a mobile object signal of the radar control unit 39 for predicting a possibility of a contact of the vehicle, an alarm can be issued to the occupant 10 if a possibility of a contact of the vehicle is predicted. Accordingly, it is possible to effectively issue an alarm to the occupant 10.

In addition, since the electric seatbelt control unit 35 carries out a tightening operation of the seatbelt 14 by turning the electric motor 29 after a warning operation is executed, the occupant 10 is caused to recognize a possibility of a contact of the vehicle at an earlier stage than an operation for tightening the seatbelt 14 which is carried out when the possibility of a contact of the vehicle is increased, and the occupant 10 is caused to carry out a contact avoiding operation. Therefore, it is possible to effectively issue an alarm to the occupant 10.

Also, in the above description, a description is given, as an example, of the case in which both the explosive type first pretensioner 28 and the second pretensioner 30 using the electric motor 29 are disposed at the retractor 20 side. However, the explosive type first pretensioner 28 may be provided at the retractor 20 side, and the second pretensioner 30 may be provided at the buckle 26 side. In this case, the second pretensioner 30 restrains the seatbelt by retracting the buckle 26 by means of the electric motor 29. Further, the relationship between the first pretensioner 28 and the second pretensioner 30 may be inverted.

Also, the seatbelt device 15 may be provided for the driver as a matter of course and may be provided for seats of passengers other than the driver.

In addition, it is possible that an electric motor 29 exclusively for turning is employed. In this case, the electric seatbelt control unit 35 carries out control of the electric motor 29 and control for connection and disconnection of mechanical engagement between the reel 31, which winds the seatbelt 14, and the electric motor 29, whereby the above-described operation is carried out by alternately repeating tightening of the seatbelt 14 and releasing thereof.

INDUSTRIAL APPLICABILITY

The present invention relates to a travel safety device for a vehicle, which increases safety in traveling.

According to the invention, when the correlation calculating unit calculates a correlation involving the distance between the vehicle and an object existing in the traveling direction thereof based on a detection result of an object detecting unit, the safety device operation control unit determines a possibility of a contact between the vehicle and the object based thereon. If there is a possibility of a contact, the safety device operation control unit automatically decelerates the vehicle by an automatic brake unit which is a safety device secured in the vehicle, and at the same time, carries out tightening of the seatbelt and releasing thereof by the seatbelt device in line therewith. A occupant is caused to bodily sense a degree of deceleration by the deceleration brought about by such an automatic brake unit, and the occupant is caused to bodily sense shaking brought about by the seatbelt through tightening of the seatbelt and releasing thereof by the seatbelt device in line therewith. That is, an alarm is issued to the occupant. Therefore, the occupant can be urged to carry out a contact avoiding operation by suitably issuing an alarm.

The invention claimed is:

1. A travel safety device for a vehicle comprising:
an object detecting unit which detects an object existing in a traveling direction of the vehicle;
a correlation calculating unit which calculates a correlation involving a distance between the vehicle and the object based on a detection result of the object detecting unit;
a safety unit including an automatic brake unit which automatically decelerates the vehicle and a seatbelt device including an electric motor which automatically tightens the seatbelt and releases the tightening thereof; and a safety device operation control unit which determines a possibility of contact between the vehicle and the object based on the correlation calculated by the correlation calculating unit, and when it is predicted that there is a possibility of contact simultaneously actuates the automatic brake unit and seatbelt device, wherein the safety device operation control unit is constructed so that, when the distance between the vehicle and the object enters a predetermined range based on the correlation calculated by the correlation calculating unit, the automatic brake unit causes generation of a deceleration to a degree which is capable of allowing the occupant to recognize that a braking force has been generated, and the seatbelt device alternates between tightening and releasing the seatbelt, when such a state is maintained for a predetermined period of time, where the distance between the vehicle and the object enters a predetermined range, an even higher degree of deceleration is generated by the automatic brake unit, and the seatbelt device causes the seatbelt to be fixed in its stopped state for at least a predetermined period of time after the seatbelt is tightened, in a tightening operation of the seatbelt, a current value of the electric motor is temporarily increased by setting the current limit to a predetermined initial limit value for a predetermined initial time immediately after rotation of the electric motor is commenced to remove slack in the seatbelt, and the current limit thereafter is set to a predetermined limit value which is lower than the initial limit value to lower the current value, and the tension of the predetermined value is generated for the seatbelt.

2. A travel safety device for a vehicle comprising:

an object detecting unit which detects an object existing in a traveling direction of the vehicle;

a correlation calculating unit which calculates a correlation involving a distance between the vehicle and the object based on a detection result of the object detecting unit;

a safety unit including an automatic brake unit which automatically decelerates the vehicle and a seatbelt device which automatically tightens the seatbelt and releases the tightening thereof;

a braking operation detecting unit which detects a braking operation carried out by a driver;

a vehicle speed detecting unit which detects the speed of the vehicle; and a safety device operation control unit which determines a possibility of contact between the vehicle and the object based on the correlation calculated by the correlation calculating unit, and, when it is predicted that there is a possibility of contact, simultaneously actuates the automatic brake unit and seatbelt device, wherein the safety device operation control unit is constructed so that, when the distance between the vehicle and the object enters a predetermined range based on the correlation calculated by the correlation calculating unit, the automatic brake unit causes generation of a deceleration to a degree which is capable of allowing the occupant to recognize that a braking force has been generated, and the seatbelt device alternates between tightening and releasing of the seatbelt, when such a state is maintained for a predetermined period of time, where the distance between the vehicle and the object enters a predetermined range, an even higher degree of deceleration is generated by the automatic brake unit, and the seatbelt device causes the seatbelt to be fixed in its stopped state for at least a predetermined period of time after the seatbelt is tightened, the seatbelt fixed in its stopped state by the seatbelt device is released in at least one of the states where it is detected based on a detection result of the braking operation detecting unit that a braking operation is released after the braking operation is carried out by a driver and where it is detected based on a detection result of the vehicle speed detecting unit that the vehicle stops.

3. A travel safety device for a vehicle comprising:

an object detecting unit which detects an object existing in a traveling direction of the vehicle;

a correlation calculating unit which calculates a correlation involving a distance between the vehicle and the object based on a detection result of the object detecting unit;

a safety unit including an automatic brake unit which automatically decelerates the vehicle, a seatbelt device which automatically tightens the seatbelt and releases the tightening thereof, and airbag devices;

a collision sensor which detects a collision of the vehicle; and a safety device operation control unit which determines a possibility of contact between the vehicle and the object based on the correlation calculated by the correlation calculating unit, and, when it is predicted that there is a possibility of contact, simultaneously actuates the automatic brake unit and seatbelt device, wherein the automatic brake unit is constructed so as to be capable of decelerating the vehicle in a plurality of different deceleration patterns, and the seatbelt device is constructed so as to be capable of tightening and releasing the seatbelt in a plurality of different operation patterns, wherein the safety device operation control unit is constructed so that, when the distance between the vehicle and the object enters a predetermined range based on the correlation calculated by the correlation calculating unit, the automatic brake unit causes generation of a deceleration to a degree which is capable of allowing the occupant to recognize that a braking force has been generated, and the seatbelt device alternates between tightening and releasing the seatbelt, when such a state is maintained for a predetermined period of time, where the distance between the vehicle and the object enters a predetermined range, an even higher degree of deceleration is generated by the automatic brake unit, and the seatbelt device causes the seatbelt to be fixed in its stopped state for at least a predetermined period of time after the seatbelt is tightened, and actuates the airbag devices when the collision sensor detects the collision of the vehicle.

* * * * *